April 5, 1955     N. R. G. EKWALL     2,705,617
PASTEURIZING APPARATUS OF THE PLATE TYPE
Filed Aug. 11, 1950     4 Sheets-Sheet 1

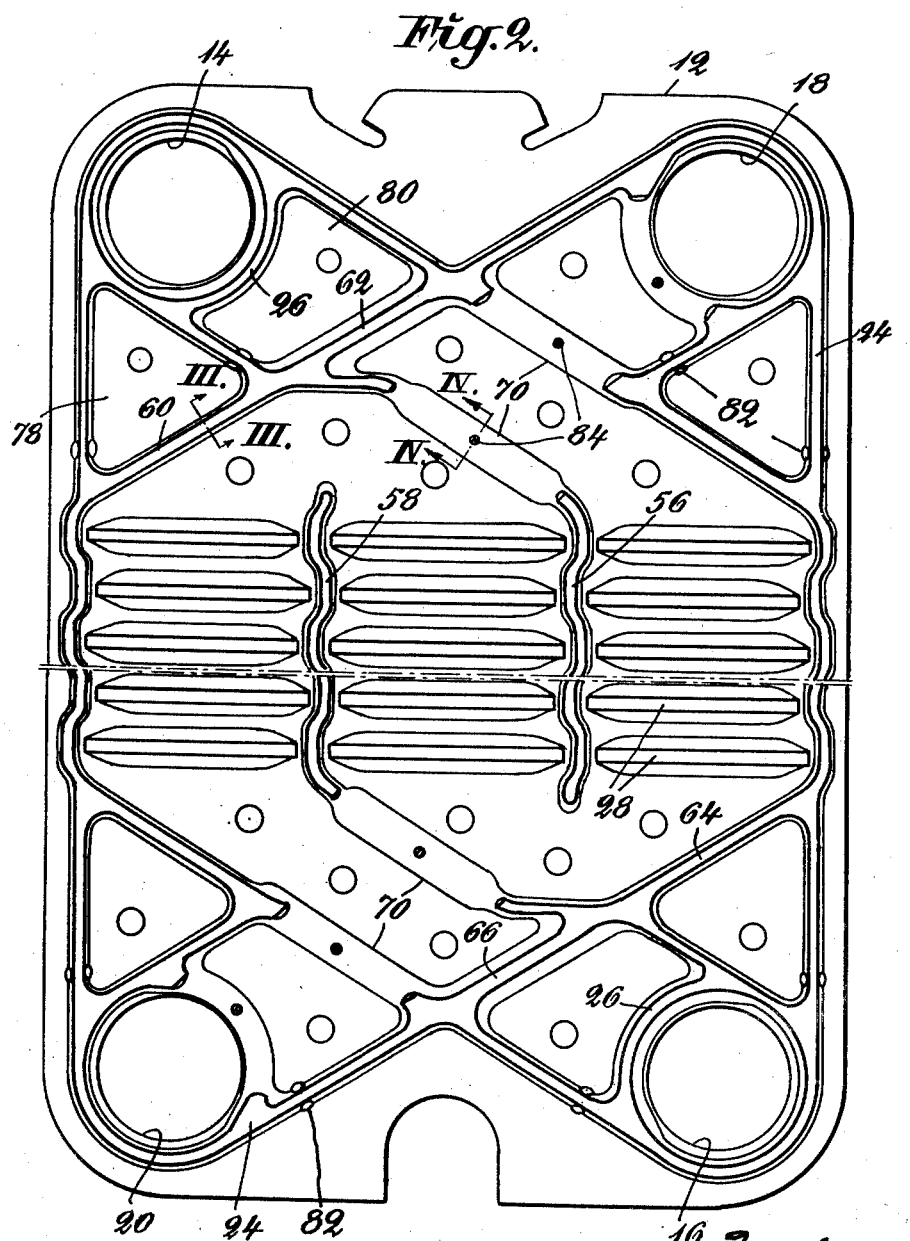

April 5, 1955 N. R. G. EKWALL 2,705,617
PASTEURIZING APPARATUS OF THE PLATE TYPE
Filed Aug. 11, 1950 4 Sheets-Sheet 3
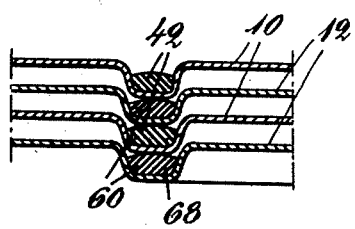
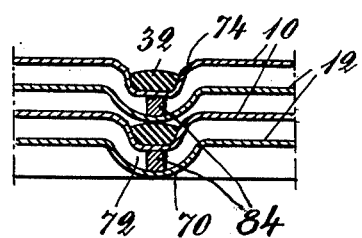
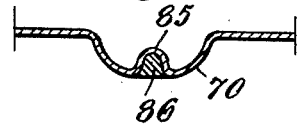
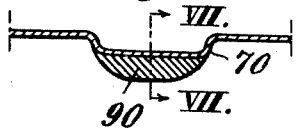
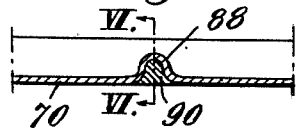

United States Patent Office 2,705,617
Patented Apr. 5, 1955

2,705,617

PASTEURIZING APPARATUS OF THE PLATE TYPE

Nils Richard Gösta Ekwall, Nykoping, Sweden

Application August 11, 1950, Serial No. 178,844

1 Claim. (Cl. 257—245)

My invention relates to pasteurizing apparatus of the plate type provided with spaced superimposed parallel plates having packing fillets extending around their edges and with alternate plate interspaces communicating with inlets and outlets for the respective media subjected to heat exchange in the apparatus, one of said media preferably comprising cream.

It has already been proposed to divide the interspaces for the latter medium into passages, preferably at least three such passages, of a width smaller than that of the plate, the said passages being so formed as to have the medium in question flowing in succession through the same. Thus one and the same pasteurizing apparatus may be constructed with compartments for the simultaneous treatment of skim-milk as well as of cream with the aid of plates of the same external dimensions throughout, it being ensured also that the cream, in spite of its small quantity relative to that of the skim-milk, will have a sufficiently high velocity of flow imparted thereto to prevent burning the same.

According to the abovementioned proposal, said passages are obtained by branch passages extending from the packing fillets in a longitudinal direction, said branches being connected alternately to the opposite transverse end portions of the marginal fillet. At the point or points where the cream is conveyed at one end portion of the plate from one passage to the next, a pocket will be produced which is closed outwardly and laterally. This may result in air carried along with the cream being collected in the pocket, which in turn may cause the cream to deposit and to burn on the plates in the upper corners of the pocket.

An accumulation of air of this kind may be prevented by the incorporation of aeration valves, but this, however, causes a considerable complication in construction. On the other hand, if the portions of the packing fillets bounding the pocket at the end and laterally are formed arcuately so that the air is compelled to follow with the cream, a pocket is formed outside the packing fillet, which pocket finds an outlet only in an upward direction. Any leakage of cream or the like, which becomes sour and forms a source of bacteria, may collect in this pocket so that even this expedient is not satisfactory.

The main object of my invention is to provide an improved construction of plate for pasteurizing apparatus of the type set forth which produces a high velocity of the medium being treated and at the same time avoids the formation of pockets adapted to accumulate air or cream.

Further objects and advantages of the invention will be apparent from the following description considered in connection with the accompanying drawings, which form a part of this specification, and of which:

Figs. 1 and 2 show portions of two plates in elevation.

Figs. 3 and 4 are sections on the lines III—III and IV—IV respectively of Figs. 1 and 2 on a larger scale.

Fig. 5 shows a section similar to that of Fig. 4 through a plate according to a somewhat modified construction.

Fig. 6 shows a further modification, this figure being a section on line VI—VI of Fig. 7, which in turn is a section on line VII—VII of Fig. 6.

Figure 1:
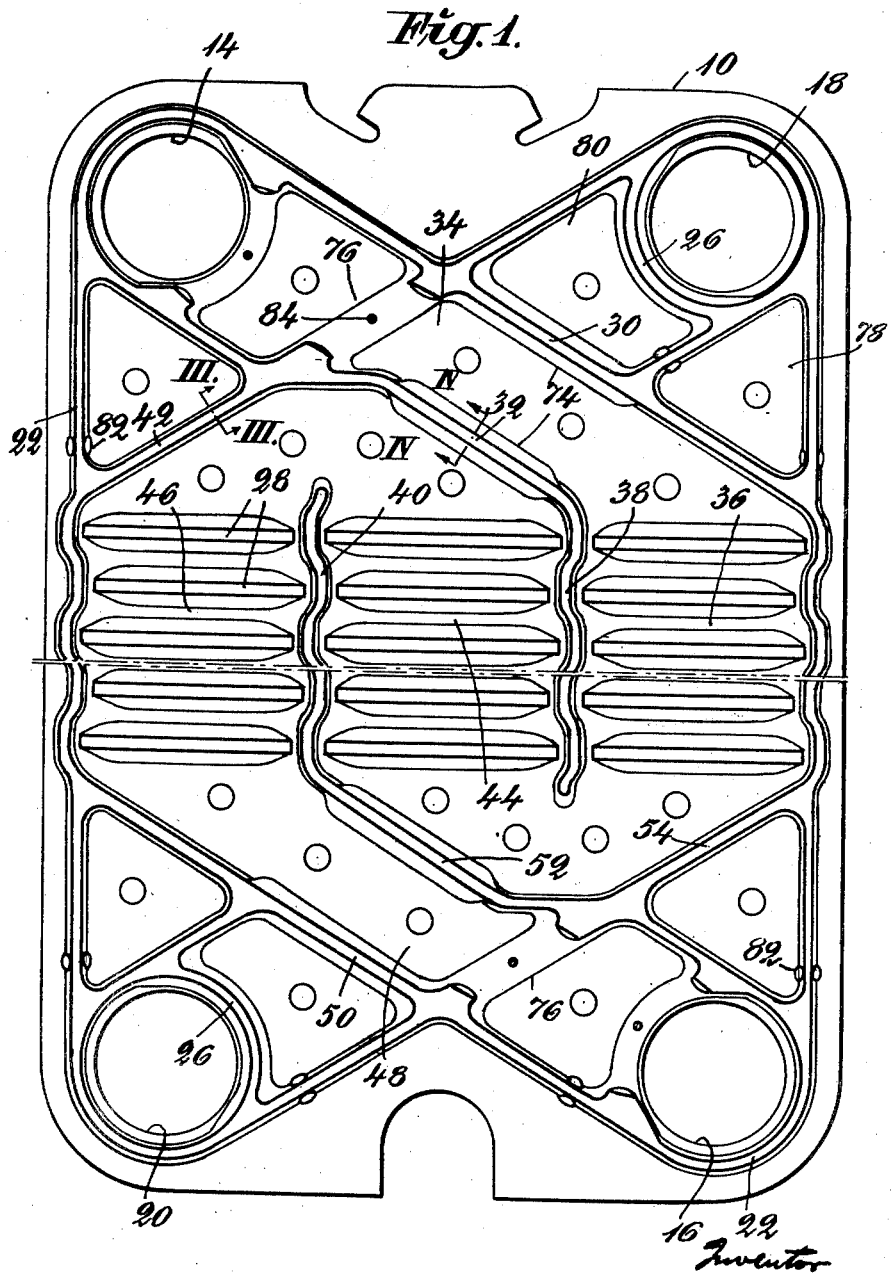
Figure 8:
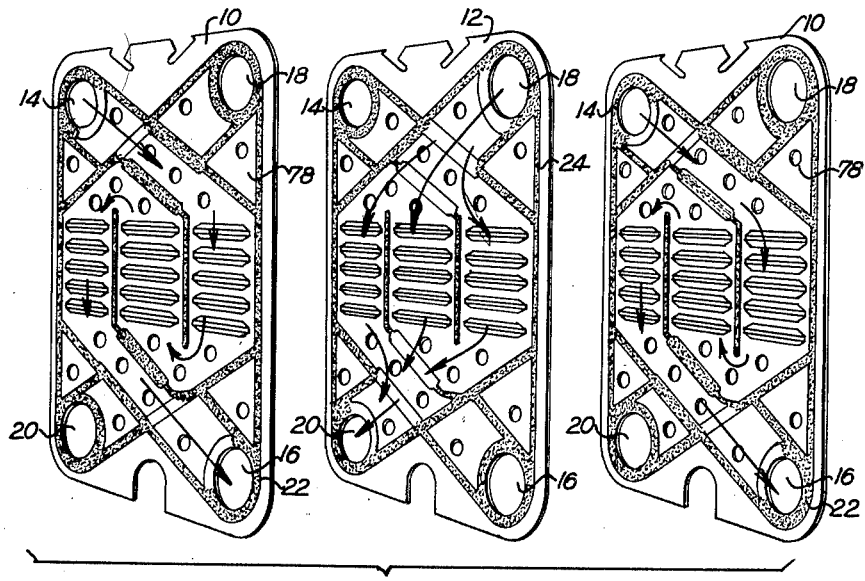
Fig. 8 is an exploded perspective view showing the arrangement of the alternate plates as well as the flow path of the fluids.

Each interspace provided for the cream or other liquid in the pasteurizing apparatus is defined by alternately arranged plates 10 illustrated in Fig. 1 and plates 12 illustrated in Fig. 2, disposed so as to provide adjacent interspaces for the two heat-exchanging media. The interspace formed between the plate 10 and a plate 12 located above the same will receive the cream flowing therethrough, while the other medium, primarily a heating medium such as steam, flows through the interspaces having the plates disposed in the reverse order.

The cream enters the interspace through an opening 14 in the left-hand upper corner of the plates 10, as viewed in Fig. 1, and escapes through an opening 16 at their right-hand lower corner. The steam enters the adjacent interspace through an opening 18 in the right-hand upper corner of the plates 12 and escapes through an opening 20 in the diagonally located lower corner. To permit the passage of the respective media to the various interspaces, all plates 10 and 12 have openings in all of the four corners, as shown in the figures. Extending around the edges of the plates are marginal packing fillets 22, 24 inserted into grooves, these fillets passing on the outside of the openings 14, 20 and enclosing said openings as an annulus, as indicated at 26, where packing of one medium relatively to the interspace of the other medium is required.

The plates 10, 12 are provided with transversely extending projections 28 for the greater portion of their length inside the fillets 22, 24; some of said projections are shown in Figs. 1 and 2 and are pressed in the same side of the plate as the grooves of the fillets. The projections 28 act so as to impart to the media an undulating turbulent flow, which in known manner has a favourable action on the heat transfer between said media.

The plate 10 has adjacent the upper edge thereof a packing fillet 30 extending from the marginal fillet 22 above the opening 14, obliquely downwardly across the plate to the portion of the marginal fillet located somewhat below the opening 18. Another packing fillet 32 extends substantially parallel to the fillet 30 and merges into the marginal fillet 22 at the lower side of the opening 14. Thus an obliquely disposed channel 34 will be formed for the cream extending across the plate in its transverse direction all the way to a longitudinal passage 36, bounded inwardly by an extension 38 of the fillet 32, extending downwardly over that part of the plate provided with projections 28, but terminating at a distance from the bottom of the base of the plate as viewed in Fig. 1.

From said base extends a branch fillet 40, which also passes through the undulating part of the plate and terminates somewhat below the fillet 32. Connected to the latter is a packing fillet member 42, disposed obliquely but in a direction opposed to that of the fillet 32, and made integral with the marginal fillet 22.

After the cream has flowed through the passage 36, it is forced upwardly through the passage 44 between the packings 38 and 40, and then continues to the passage 46 on the left hand side of the packing 40. The passage 46 communicates with a passage 48 of the same shape and dimensions as the passage 34 and communicating with the outlet opening 16. The channel 48 is bounded on its lower side by an obliquely disposed packing 50 and on its upper side by a fillet 52, both of which extend to the marginal fillet 22 one on each side of the opening 16. The fillet 52, of which the branch 40 constitutes a continuation, has a branch 54 corresponding to the fillet 42.

The plate 12 has inner packing fillets 56 and 58 located opposite the fillets 38, 40 of plate 10 and extending only over the undulating central part of the plate and thus leaving transversely extending passages both at the top and at the bottom. The upper inlet openings 18 and the lower outlet openings 20 are thus in direct communication with the interspace over its entire width. A packing fillet 60 located in back of the fillet portion 42 on the opposite side of plate 10 is extended as indicated at 62 up to that portion of the marginal fillet 24 enclosing the opening 18. This is also the case with the corresponding packing fillet 64 at the lower portion of the plate 12, which is connected by means of an extension 66 to the marginal fillet 24 adjacent the opening 20.

The grooves provided for the packing fillets are shown in section in Fig. 3, where they are designated by 68. To provide for the various paths of flow in each alternate interspace, the plate 12 has portions 70 forming a continuation of the adjacent grooves 68 but being wider than the latter so as to provide a free passage 72 as shown in Fig. 4. Those portions of the grooves in the plate 10 which are located opposite the widened grooves 70 in the plate 12 have somewhat downwardly bent edges 74 to make room for the grooves 70. The plate 10 in turn shows a similar widened groove portion 76 in the channels 34 and 48.

As a result of the configuration of the packing fillets described above pockets 78, 80 are formed between the plates located outside the interspaces through which the media flows and being entirely surrounded by packing fillets in the embodiment shown. These pockets may be drained by the provision of small folds or projections 82 transversely across the grooves and, further, the fillets may be provided with transverse recesses. It is obviously also possible to provide divided fillets to create outlets, although the integral form is preferred from the point of view of mounting.

The relative spacing of the plates 10, 12 at the groove portions 70, 76 may be ensured by means of distance pieces, for instance in the form of small cylinders 84, welded to the base of the grooves as shown in Figs. 1, 2 and 4. However, such spacers may also be formed by pressing up a boss 85 as shown in Fig. 5 in the base of the groove, said boss being filled with welding material 86 on its hollow side. The groove may also be formed with a transverse hollow rib 88, which is filled with welding material 90 so as to leave no hollow on the lower side.

An important feature of all of the above described distance pieces is that they require less precision in manufacture than has been the case with constructions hitherto known, which merely consisted of punched bosses or knobs. The distance pieces fulfil their object in a reliable manner even in the case of slight displacement between the same and the bearing surface of the adjacent plate occasioned, for instance, if the plates become heated unevenly.

In operation of the apparatus, the cream flows along the path 34, 36, 44, 46, 48 and due to the configuration of the fillet elements 32, 42 all dead pockets are avoided, when the cream passes around the branch fillet 40, thus preventing any air present in the cream from remaining in said path. In the steam interspaces the steam is caused to pass through the various paths formed by the fillets 56, 58 in a parallel flow. The construction also ensures that the cream reaches a velocity of flow three times as high as would be the case with a construction without the inner fillet elements 38, 40. The condensate forming in steam interspaces can flow away without obstruction so that a high coefficient of heat transfer is constantly maintained. The fillets 56, 58 are not required for regulating the passage of the steam and thus serve primarily as distance pieces between the plates.

The projections 28 are preferably displaced relative to each other, or are of different lengths and the marginal packing fillets 22 and 24 respectively are formed to follow the ends of the projections, so that the fillet has a serpentine-like form adjacent the projections. In this manner an undulating channel is formed between the marginal fillet and the ends of the projections in the plane of the plate, in which channel an undulating motion is imparted to the cream, which advantageously counteracts burning of the cream along the edge of the plate. In a similar manner the central grooves for the fillets 38, 40 and 56, 58, respectively, may be of serpentine-like form.

While more or less specific embodiments of the invention have been shown, it is to be understood that this is for purpose of illustration only, and the invention is not to be limited thereby, but its scope is to be determined by the appended claim.

What I claim is:

A heat exchanger comprising a series of spaced generally parallel substantially rectangular plates, marginal packing means between adjacent plates defining the perimeter of space between adjacent plates and encompassing an inlet and an outlet for each alternate space and a second inlet and outlet for each other alternate space, said first inlet and outlet and said second inlet and outlet being disposed adjacent diagonally opposite corners of said plates, additional packing means comprising spaced strips on one surface of alternate plates engaging adjacent plates to provide an inlet channel, a series of at least three intermediate channels and an outlet channel, said inlet channel communicating with said first inlet and one end channel of said intermediate channels, said outlet channel communicating with said first outlet and the other end channel of said intermediate channels, said inlet and outlet channels being substantially parallel and inclined with relation to said intermediate channels and merging into a packing strip inclined in the opposite direction said last named strip merging into one of said strips defining one of said intermediate channels and together providing one wall of a connecting channel between two of said intermediate channels, additional packing means comprising spaced strips on one surface of other alternate plates engaging adjacent plates to provide a second inlet channel, at least three intermediate channels and a second outlet channel, said second inlet channel communicating with said second inlet and said last named intermediate channels and said second outlet channel communicating with said second outlet and said last named intermediate channels and said second inlet and outlet channels being substantially parallel and inclined with relation to said last named intermediate channels whereby one fluid may flow through the channels of each alternate space and a second fluid flow through the channels of each other alternate space.

References Cited in the file of this patent

UNITED STATES PATENTS

| | | |
|---|---|---|
| 1,609,971 | Seligman | Dec. 7, 1926 |
| 1,770,254 | Seligman | July 8, 1930 |
| 1,992,097 | Seligman | Feb. 19, 1935 |
| 2,197,118 | Astle | Apr. 16, 1940 |

FOREIGN PATENTS

| | | |
|---|---|---|
| 65,460 | Denmark | Feb. 17, 1947 |
| 524,909 | Great Britain | Aug. 16, 1920 |
| 615,905 | Great Britain | Jan. 13, 1949 |